(No Model.)
J. F. MILLER.
WEANING MUZZLE FOR ANIMALS.
No. 382,237. Patented May 1, 1888.
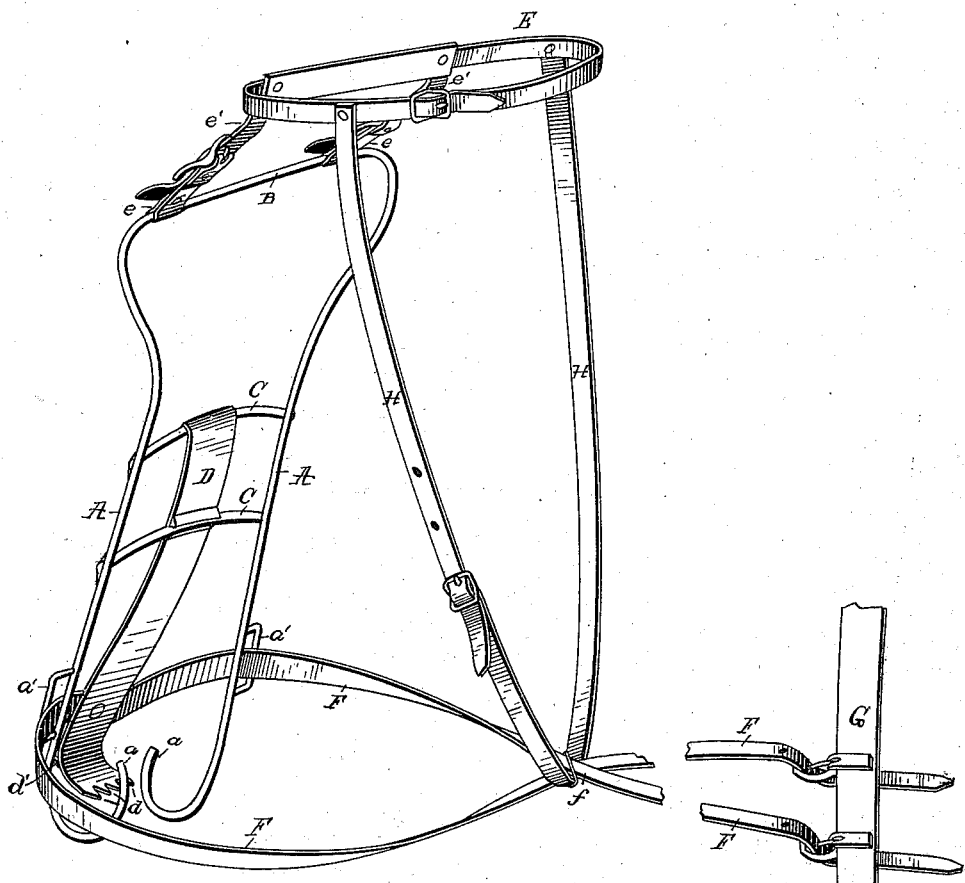

UNITED STATES PATENT OFFICE.

JOHN F. MILLER, OF LEE, ASSIGNOR OF ONE-HALF TO BENJAMIN A. LINVILL, OF WHITE, INDIANA.

WEANING-MUZZLE FOR ANIMALS.

SPECIFICATION forming part of Letters Patent No. 382,237, dated May 1, 1888.

Application filed October 5, 1887. Serial No. 251,537. (No model.)

*To all whom it may concern:*

Be it known that I, JOHN F. MILLER, a citizen of the United States, residing at Lee, in the county of White and State of Indiana, have invented certain new and useful Improvements in Calf-Weaners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a calf-weaner, and has for its object to provide a simple device for weaning stock and preventing it jumping fences, which will be economical in cost of construction, compact in arrangement, easily applied, and efficient for the purposes intended.

The improvement consists in a frame to be applied to the face of the animal, and terminating in hooks at its lower end, which are adapted to enter the nostrils, a spring-plate secured to the frame at one end, and having its other or free end provided with teeth, and a harness for securing the device to the animal in such a manner that an attempt on the part of said animal to jump over an inclosure will cause the prongs or teeth of said spring-plate to prick its nose, and effect a discontinuance of the attempt, and in a short space of time effect a complete cure of said habit.

The improvement further consists in the details of construction and novel features hereinafter set forth and claimed, and shown in the annexed drawings, in which Figure 1 is a perspective view of my invention; and Fig. 2, a detail view of the lower end of the spring-plate, showing more clearly the oppositely-disposed prongs.

The frame is composed of the side bars, A, the end bar, B, and the cross brace-rods C. The lower ends of the side bars, A, terminate in nose-hooks $a$—that is, hooks which are adapted to enter the nostrils of the animal. The upper ends of the side bars curve outwardly to give a more extended bearing to the frame upon the face or forehead of the animal. The side bars, the end bar, and the nose-hooks are formed of a single piece of stout wire bent into or substantially into the form shown. The cross brace-rods are secured at their ends to the side bars in any of the well-known ways, preferably by soldering or brazing. The spring-plate D, secured at its upper end to the cross brace-rods C, and curving outwardly and inwardly at its lower end, has said lower end extending substantially at right angles to the frame and provided with a series of prongs or teeth, $d$, which, under certain conditions, presently to be referred to, prick the nose of the animal. The plate D is also provided with teeth $d'$ near its lower end, which extend outward, and are designed to prick the flank of the mother when the calf or other nursling attempts to suckle. The harness for securing the device to the animal is composed of the head-strap E, which is to be buckled around the horns of an animal, or fastened to the halter when the animal is without horns, the short straps $e$ and $e'$ for connecting the head-strap with the frame, said straps $e$ and $e'$ being buckled together to adjust the device to different sizes of animals, the strap F secured at its middle to the spring-plate D, and having its ends passing through eyes $a'$ on the side bars, A, and crossing at $f$, and adapted to be buckled to the surcingle G beneath the animal's stomach, and the side straps, H, fastened at their upper ends to the head-strap E, and having their lower ends buckled together and connected with the strap F at $f$, for supporting the said strap when the animal is feeding.

The device being applied as above set forth, the teeth or prongs $d$ of the spring-plate D will be at a slight distance from the animal's nose.

When the animal attempts to jump, and raises its head, the tension on the strap F will cause an inward movement of the spring-plate and force the teeth $d$ into its nose.

Having thus described my invention, what I claim, and desire to secure by Letters Patent, is—

1. A weaner composed of a frame having nose-hooks, and a spring-plate secured at one end to the frame and having its other end provided with oppositely-disposed teeth, substantially as and for the purpose specified.

2. A weaner composed of side bars terminating at their lower ends in nose-hooks, the end bar connecting the upper ends of said side bars, the cross brace-rods, and the spring-plate secured at its upper end to the cross-rods and having its lower end curved outwardly, and inwardly terminating in teeth, and having exterior teeth, substantially as and for the purpose set forth.

3. A weaner composed of side bars having nose-hooks, and joined by an upper end bar, the cross brace-rods uniting the side bars, and the spring-plate having teeth or prongs arranged substantially at right angles to the plane of the frame, and having its upper end secured to said cross brace-rods, substantially as specified.

4. The combination, with the frame, having the spring-plate provided with inner and outer teeth, of the head-strap, and the short straps $e$ and $e'$, buckled together for adjustably connecting the frame with the head strap, substantially as specified.

5. The combination, with the frame, and the spring-plate having inner and outer teeth, of the head-strap, the strap F, and the side straps for supporting the strap F, substantially as and for the purpose described.

6. The herein shown and described weaner, composed of the frame having nose-hooks, the spring-plate having inner and outer teeth, the head-strap, the short straps connecting the head-strap with the frame, the strap F, and the side straps for supporting the strap F, substantially as set forth.

In testimony whereof I affix my signature in presence of two witnesses.

JOHN F. MILLER.

Witnesses:
O. McCONAHAY,
HORTIE GRAVES.